March 16, 1926.

C. PICKER 1,576,543

ELECTRIC FIXTURE MOUNTING BRACKET

Filed April 17, 1924

Inventor
Chas. Picker

By Clarence A. O'Brien
Attorney

Patented Mar. 16, 1926.

1,576,543

UNITED STATES PATENT OFFICE.

CHARLES PICKER, OF ALBANY, NEW YORK.

ELECTRIC-FIXTURE MOUNTING BRACKET.

Application filed April 17, 1924. Serial No. 707,220.

*To all whom it may concern:*

Be it known that I, CHARLES PICKER, a citizen of the United States, residing at Albany, in the county of Albany and State of New York, have invented certain new and useful Improvements in Electric-Fixture Mounting Brackets, of which the following is a specification.

This invention relates to improvements in electric fixture mounting or hanging brackets adapted for suspending electric fixtures from a ceiling.

An object of the invention resides in providing a pair of bracket members of similar formation having offset end portions adapted to form securing feet, adapted to be secured to a suitable support, and provided with slotted body portions for receiving bolts adapted to secure a plate member, in adjustable relation thereto, said plate member carrying a threaded sleeve for receiving a portion of the fixture for suspending it from said support.

Another object of the invention resides in providing an insulated fixture support comprising a pair of angle brackets having securing feet adapted to be secured to a suitable support, the body portions of the brackets being offset with respect to said feet and adjustably mounted in connection with a bar member formed of suitable insulating material, having a threaded aperture in the central portion for receiving a threaded sleeve member, on which is adapted to be mounted the upper member of a ceiling fixture.

The invention further comprehends other objects and improvements in the details of construction and arrangement of the parts for carrying out the essential features of the invention, which are more particularly carried out in the following description and claim, directed to a preferred form of the invention, it being understood, however, that variations may be made, in this construction, without departing from the spirit and scope of this invention, as described and claimed.

In the drawing, forming a part of this application:

Figure 1:
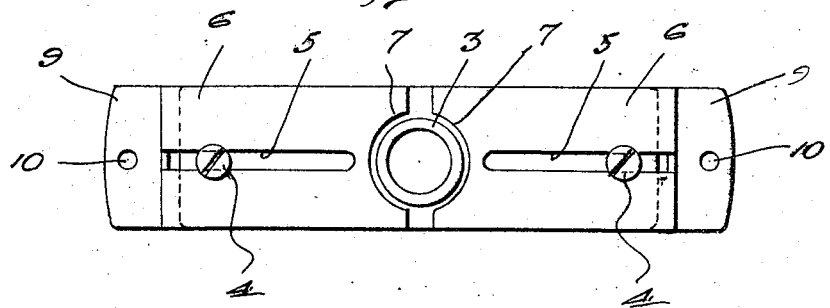
Figure 1 is a bottom plan view of the fixture mounting bracket.
Figure 2:
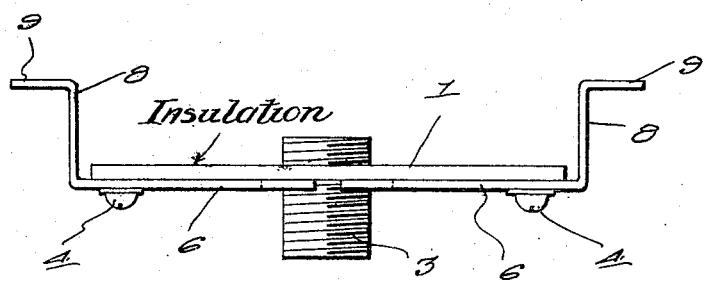
Figure 2 is a side elevation thereof.
Figure 3:
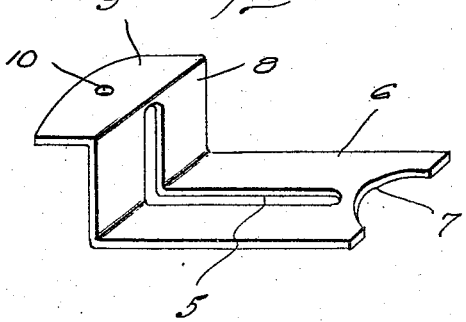
Figure 3 is a detail perspective view of one of the bracket members adapted to be secured to a support.
Figure 4:
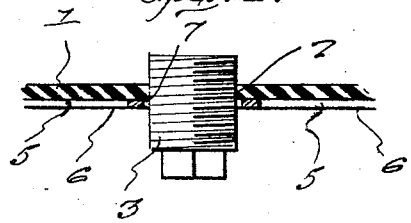
Figure 4 is a longitudinal sectional view through the central portion of the bar member and bracket members secured thereto, showing the relation of said members to the sleeve carried by the bar member.

1 indicates a bar member preferably constructed of a suitable form of insulation or other material, non-conductive to electricity, in the central portion of which is formed a threaded opening 2, for receiving a threaded sleeve member 3, to which is adapted to be attached one of the members of an electric fixture, by which the fixture may be supported from the bar member 1. At opposite ends, the bar member mounts the pair of screws 4, threadably connected therewith and projected through slotted portions 5 of bracket members 6, the adjacent ends of which are provided with arcuate recesses 7, for permitting the adjustment of the ends of the bracket in relative close proximity, the arcuate portion 7 being adapted to receive the opposite sides of the sleeve 3. The outer ends of the bracket members 6 are offset a substantial distance, as shown at 8, in Figure 2, to provide securing feet 9, having openings 10 therein, for receiving suitable bolts or screws, for securing said securing feet to a suitable wall or other support.

From this construction, it will be seen that a relatively simple fixture support has been provided wherein the feet 9 can be secured to a ceiling or other suitable support for a fixture, for suspending and holding the bar member 1, carrying the sleeve 3, in spaced relation with the surface of the support, and in insulated relation thereto, for receiving one member of an electric fixture for hanging or supporting the same relative to said support.

What is claimed is:

A fixture mounting bracket of the class described comprising a bar of insulation material provided between its ends with a screw threaded opening, a screw threaded sleeve threaded into said opening, a pair of attaching brackets embodying inwardly directed horizontally disposed slotted portions slidably contacting the under side of said bar, the outer end portions of said brackets being directed vertically at right angles to the horizontal portions, and the free ends of the vertically disposed portions being directed in opposite directions to extend in substantial parallelism with the horizontal slotted portions, said free end portions being formed with openings for passage of fasteners, and bolts carried by the bar and extending through the slots in said horizontal portions.

In testimony whereof I affix my signature.

CHARLES PICKER.